(12) United States Patent
Hamilton, II et al.

(10) Patent No.: US 8,272,043 B2
(45) Date of Patent: *Sep. 18, 2012

(54) FIREWALL CONTROL SYSTEM

(75) Inventors: Rick A. Hamilton, II, Charlottesville, VA (US); Brian M. O'Connell, Cary, NC (US); John R. Pavesi, Cedar Park, TX (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1074 days.

This patent is subject to a terminal disclaimer.

(21) Appl. No.: 11/766,146

(22) Filed: Jun. 21, 2007

(65) Prior Publication Data

US 2008/0320584 A1    Dec. 25, 2008

(51) Int. Cl.
*H04L 29/06* (2006.01)

(52) U.S. Cl. ............. 726/13; 726/11; 726/14; 726/15; 713/151; 713/152; 713/153

(58) Field of Classification Search .......... 726/13
See application file for complete search history.

(56) References Cited

U.S. PATENT DOCUMENTS

| | | | |
|---|---|---|---|
| 6,161,182 A | 12/2000 | Nadooshan | 713/172 |
| 6,219,790 B1 | 4/2001 | Lloyd et al. | |
| 6,584,505 B1 | 6/2003 | Howard et al. | |
| 6,651,096 B1 | 11/2003 | Gai et al. | 709/223 |
| 6,754,820 B1 | 6/2004 | Scheidt et al. | |
| 7,039,812 B2 | 5/2006 | Kawan et al. | |
| 7,054,944 B2 | 5/2006 | Tang et al. | 709/229 |
| 7,082,532 B1 | 7/2006 | Vick et al. | |
| 7,085,934 B1 | 8/2006 | Edwards | |
| 7,162,649 B1 | 1/2007 | Ide et al. | 713/165 |
| 7,546,629 B2 | 6/2009 | Albert et al. | 726/1 |

(Continued)

FOREIGN PATENT DOCUMENTS

EP    1 465 382 B1    10/2007

(Continued)

OTHER PUBLICATIONS

ISR including PCT transmittal, from the International Searching Authority, mailed May 11, 2008. Applicant: International Business Machines Corporation, International Application No. PCT/EP2008/057937, pp. 4.

(Continued)

*Primary Examiner* — Longbit Chai
(74) *Attorney, Agent, or Firm* — Schmeiser, Olsen & Watts; Mark Vallone

(57) ABSTRACT

Generally speaking, systems, methods and media for implementing a firewall control system responsive to user authentications are disclosed. Embodiments of a method may include receiving a data request at a firewall where the data request is associated with a program. Embodiments may include determining whether an authentication plan is required to be matched for the associated program and, if so, accessing a stored authentication plan associated with the program and having one or more authentication records each having expected information relating to user access to a particular server. Embodiments may include accessing a current authentication plan from an authentication store, the current authentication plan having one or more authentication records each having information relating to user access to a particular server. Embodiments may include comparing the stored authentication plan with the received current authentication plan to determine whether they match and, in response, performing one or more firewall actions.

20 Claims, 6 Drawing Sheets

U.S. PATENT DOCUMENTS

| | | | |
|---|---|---|---|
| 7,603,472 B2 | 10/2009 | Petry et al. | |
| 7,634,800 B2 | 12/2009 | Ide et al. ........................... | 726/3 |
| 2002/0002688 A1 | 1/2002 | Gregg et al. | |
| 2002/0112155 A1 | 8/2002 | Martherus et al. | |
| 2002/0133719 A1 | 9/2002 | Westerdal | |
| 2003/0055962 A1 | 3/2003 | Freund et al. | |
| 2003/0177389 A1 | 9/2003 | Albert et al. | |
| 2004/0078591 A1 | 4/2004 | Teixeira et al. | |
| 2004/0103317 A1* | 5/2004 | Burns ........................... | 713/201 |
| 2004/0128393 A1 | 7/2004 | Blakeley et al. .............. | 709/229 |
| 2004/0187029 A1 | 9/2004 | Ting | |
| 2005/0055578 A1 | 3/2005 | Wright et al. | |
| 2005/0102244 A1* | 5/2005 | Dickinson et al. .............. | 705/74 |
| 2005/0177869 A1 | 8/2005 | Savage et al. | |
| 2006/0005254 A1 | 1/2006 | Ross | |
| 2006/0155681 A1 | 7/2006 | Chiang et al. | |
| 2006/0265412 A1 | 11/2006 | Griffiths et al. | |
| 2007/0150553 A1 | 6/2007 | Fields et al. | |
| 2007/0172808 A1 | 7/2007 | Capone | |
| 2008/0019352 A1 | 1/2008 | Bennett | |
| 2008/0178260 A1 | 7/2008 | Schwarz et al. | |
| 2008/0271117 A1 | 10/2008 | Hamilton et al. | |
| 2008/0320580 A1 | 12/2008 | Hamilton et al. | |
| 2008/0320581 A1 | 12/2008 | Hamilton et al. | |

FOREIGN PATENT DOCUMENTS

| | | |
|---|---|---|
| WO | WO 02/03178 A2 * | 1/2002 |
| WO | WO 02/03178 A2 | 5/2002 |
| WO | WO 02/37728 A1 | 5/2002 |
| WO | 2004034672 | 2/2004 |

OTHER PUBLICATIONS

PCT Written Opinion of International Searching Authority, mailed May 11, 2008; Applicant: International Business Machines Corporation, International Application No. PCT/EP2008/057937, pp. 6.

ISR including PCT transmittal, From the International Searching Authority, mailed Jul. 18, 2008, Applicant: International Business Machines Corporation, International Application No. PCT/EP2008/054412, pp. 6.

PCT Written Opinion of International Searching Authority, mailed Jul. 18, 2008, Applicant: International Business Machines Corporation, International Application No. PCT/EP2008/054412, pp. 7.

L. Chai, Non-Final Office Action: mail date May 13, 2010; published by the USPTO in utility U.S. Appl. No. 11/766,165, pp. 17.

L. Chai, Non-Final Office Action: mail date Apr. 29, 2010; published by the USPTO in utility U.S. Appl. No. 11/765,004, pp. 15.

Haffner, Ernst-Georg, et al., "Managing Distributed Personal Firewalls with Smart Data Servers," World Conference on WWW and Internet [Online] 2001, Retrieved from the Internet: URL: http://wiki.uni.lu/secan-lab/Haffner2001.pdf; 6 pages.

ISR including PCT transmittal with PCT Written Opinion of International Searching Authority, From the International Searching Authority, mailed Feb. 23, 2009; Applicant: International Business Machines Corporation, International Application No. PCT/EP2008/057938, pp. 9.

Applicant's attorney Erik Osterrieder, Response to Non-Final Office Action of U.S. Appl. No. 11/766,165, Aug. 10, 2010, Austin, TX, USA.

Terminal Dislciamer of U.S. Appl. No. 11/766,165 in view of U.S. Appl. No. 11/765,004.

Terminal Dislciamer of U.S. Appl. No. 11/766,165 in view of U.S. Appl. No. 11/766,146.

Applicant's attorney Erik Osterrieder, Response to Non-Final Office Action of U.S. Appl. No. 11/765,004, Jul. 28, 2010, Austin, TX, USA.

Terminal Dislciamer of U.S. Appl. No. 11/765,004 in view of U.S. Appl. No. 11/766,165.

Terminal Dislciamer of U.S. Appl. No. 11/765,004 in view of U.S. Appl. No. 11/766,146.

Restriction Requirement for U.S. Appl. No. 11/741,516, Aug. 4, 2010, Alexandria, VA, USA.

Applicant's attorney Erik Osterrieder, Response to Restriction Requirement for U.S. Appl. No. 11/741,516, Aug. 5, 2010, Austin, TX, USA.

Final Office Action (Mail Date May 11, 2011) for U.S. Appl. No. 11/741,516, filed Apr. 27, 2007; Confirmation No. 3114.

Final Office Action of U.S. Appl. No. 11/766,165, Sep. 23, 2010, USPTO, Alexandria, VA, USA.

Jeffrey Schubert, Preliminary Amendment, U.S. Appl. No. 11/765,165, Jan. 24, 2011, Austin, TX, USA.

Final Office Action of U.S. Appl. No. 11/765,004, Sep. 13, 2010, USPTO, Alexandria, VA, USA.

Jeffrey Schubert, Preliminary Amendment, U.S. Appl. No. 11/765,004, Feb. 14, 2011, Austin, TX, USA.

Non-Final Office Action, U.S. Appl. No. 11/741,516, Oct. 8, 2010, USPTO, Alexandria, VA, USA.

Jeffrey Schubert, Response to Non-Final Office Action, U.S. Appl. No. 11/741,516, Feb. 23, 2011, Austin, TX, USA.

Amendment filed Apr. 24, 2012 in response to Office Action (Mail Date Feb. 1, 2012) for U.S. Appl. No. 11/766,165, filed Jun. 21, 2007; Confirmation No. 8872.

Amendment filed Apr. 9, 2012 in response to Office Action (Mail Date Jan. 11, 2012) for U.S. Appl. No. 11/765,004, filed Jun. 19, 2007; Confirmation No. 6689.

Final Office Action (Mail Date Apr. 16, 2012) for U.S. Appl. No. 11/765,004, filed Jun. 19, 2007; Confirmation No. 6689.

International Search Report including transmittal with PCT Written Opinion of International Searching Authority, From the International Searching Authority, mailed May 20, 2009; Applicant: International Business Machines Corporation, International Application No. PCT/EP2008/056192; 9 pages.

Office Action (Mail Date Jan. 11, 2012) for U.S. Appl. No. 11/765,004; filed Jun. 19, 2007; Confirmation No. 6689.

Amendment and Request for Continued Examination filed Aug. 9, 2011 in response to Final Office Action (Mail Date May 11, 2011) for U.S. Appl. No. 11/741,516, filed Apr. 27, 2007; Confirmation No. 3114.

Office Action (Mail Date Feb. 1, 2012) for U.S. Appl. No. 11/766,165, filed Jun. 21, 2007; Confirmation No. 8872.

Notice of Allowance (Mail Date May 11, 2012) for U.S. Appl. No. 11/766,165; Filing Date Jun. 21, 2007.

Amendment filed May 31, 2012 in response to Final Office Action (Mail Date Apr. 16, 2012) for U.S. Appl. No. 11/765,004; Filing Date Jun. 19, 2007.

* cited by examiner

FIREWALL CONTROL SYSTEM

FIELD OF INVENTION

The present invention is in the field of data processing systems and, in particular, to systems, methods and media for implementing a firewall control system responsive to user authentications.

BACKGROUND

Computer systems are well known in the art and have attained widespread use for providing computer power to many segments of today's modern society. As advances in semiconductor processing and computer architecture continue to push the performance of computer hardware higher, more sophisticated computer software has evolved to take advantage of the higher performance of the hardware, resulting in computer systems that continue to increase in complexity and power. Computer systems have thus evolved into extremely sophisticated devices that may be found in many different settings. Computer systems are often connected to the Internet or other broad-based network in order to communicate with other computer systems, access information or other resources, or perform various tasks associated with business, personal banking, electronic commerce transactions, or other endeavors. Connection to other systems via the Internet, however, brings with it the risk of compromise of the computer system and the data located on it from viruses, worms, Trojan horses, hackers, or other types of attacks. System developers often utilize firewalls that control traffic to and from a network to help protect the computer systems from outside attack and to otherwise control information flow to and from a computer system.

Firewall products, which are often distributed as software application programs, can be considered to fall into one of two broad categories: corporate network firewalls and personal firewalls. Corporate network firewalls (also referred to as sub-net firewalls or non-personal firewalls) monitor traffic at a network bottleneck, such as at a point where a corporate intranet interfaces to the Internet. At this position, all of the computers on the corporate intranet can be protected from threats outside the intranet originating from the Internet. This is a cost effective and efficient solution for corporations or other organizations as firewall products need only be installed and administered at the one or more key networking interfaces between the intranet(s) and the Internet. Corporate network firewalls may also monitor traffic at a network bottleneck, such as at a point where a general corporate network interfaces with a high-security corporate network, such as at a lab or research organization The second broad category of firewall product is a "personal" firewall that runs directly on a computer system. Some are distributed or provided as a separate application program, while others, such as Microsoft Corporation's Microsoft® Windows firewall are embedded in an operating system. While a personal firewall protects the computer system from threats coming from its wireless or wired network interfaces, its configuration, preferences, and performance is typically limited when compared to a corporate network firewall.

These software firewalls provide some customizable ability to restrict, allow, or monitor attempts of a particular program to send or receive data. Currently these decisions may be responsive to the network subnet the user is currently connected to, the day or time, whether requested data is inbound or outbound, whether the requested data is of a certain protocol (TCP, UDP, TCP and UDP, and ICMP), the port number to receive or send data through, the IP address or network the requested data is being sent to or received from, and the user's network adapter being used. One solution used in locations with WiFi access requires users to authenticate via a browser (such as by making payment with a credit card) before being able to use the WiFi connection. This solution requires the user to know which program to launch first in order to authenticate and only provides a simple deny/allow firewall response. Such solutions, accordingly, provide a relatively broad level of control, but do not provide for a more sophisticated, precise control of data packets going through the firewall.

SUMMARY OF THE INVENTION

The problems identified above are in large part addressed by systems, methods and media for implementing a firewall control system responsive to user authentications. Embodiments of a method may include receiving a data request at a firewall where the data request is associated with a program of the user computer system. Embodiments of the method may also include determining whether an authentication plan is required to be matched for the associated program and, if so, accessing a stored authentication plan associated with the program and having one or more authentication records each having expected information relating to user access to a particular server. Embodiments of the method may also include accessing a current authentication plan from an authentication store, the current authentication plan having one or more authentication records each having information relating to user access to a particular server. Embodiments of the method may also include comparing the stored authentication plan with the received current authentication plan to determine whether they match and, in response, performing one or more firewall actions.

Another embodiment provides a computer program product comprising a computer-useable medium having a computer readable program wherein the computer readable program, when executed on a computer, causes the computer to perform a series of operations for controlling a firewall. The series of operations generally includes receiving a data request at a firewall where the data request is associated with a program of the user computer system. The series of operations may also include determining whether an authentication plan is required to be matched for the associated program and, if so, accessing a stored authentication plan associated with the program and having one or more authentication records each having expected information relating to user access to a particular server. The series of operations may also include accessing a current authentication plan from an authentication store, the current authentication plan having one or more authentication records each having information relating to user access to a particular server. The series of operations may also include comparing the stored authentication plan with the received current authentication plan to determine whether they match and, in response, performing one or more firewall actions.

A further embodiment provides a firewall system implemented on a computer system. The firewall system may include a network stack to interrogate incoming and outgoing data packets and to apply one or more firewall rules against them to allow or deny the data packets access to a program. The firewall system may also include an authentication verifier in communication with the network stack to further control access to data packets. The authentication verifier may include an authentication module, an authentication store interface module, and a firewall action manager. The authentication module may access a stored authentication plan for a program associated with a particular data packet, the stored authentication plan having one or more authentication records each having expected information relating to access by a user to a particular server. The authentication store interface module may receive a current authentication plan for the associated program, the current authentication plan having one or more authentication records each having current information relating to access by a user to a particular server. The authentication module may compare the stored authentication plan with the current authentication plan to determine whether they match and, in response, the firewall action manager may perform one or more firewall actions.

BRIEF DESCRIPTION OF THE DRAWINGS

Aspects of certain embodiments of the invention will become apparent upon reading the following detailed description and upon reference to the accompanying drawings in which like references may indicate similar elements.

DETAILED DESCRIPTION OF EMBODIMENTS

Figure 1:
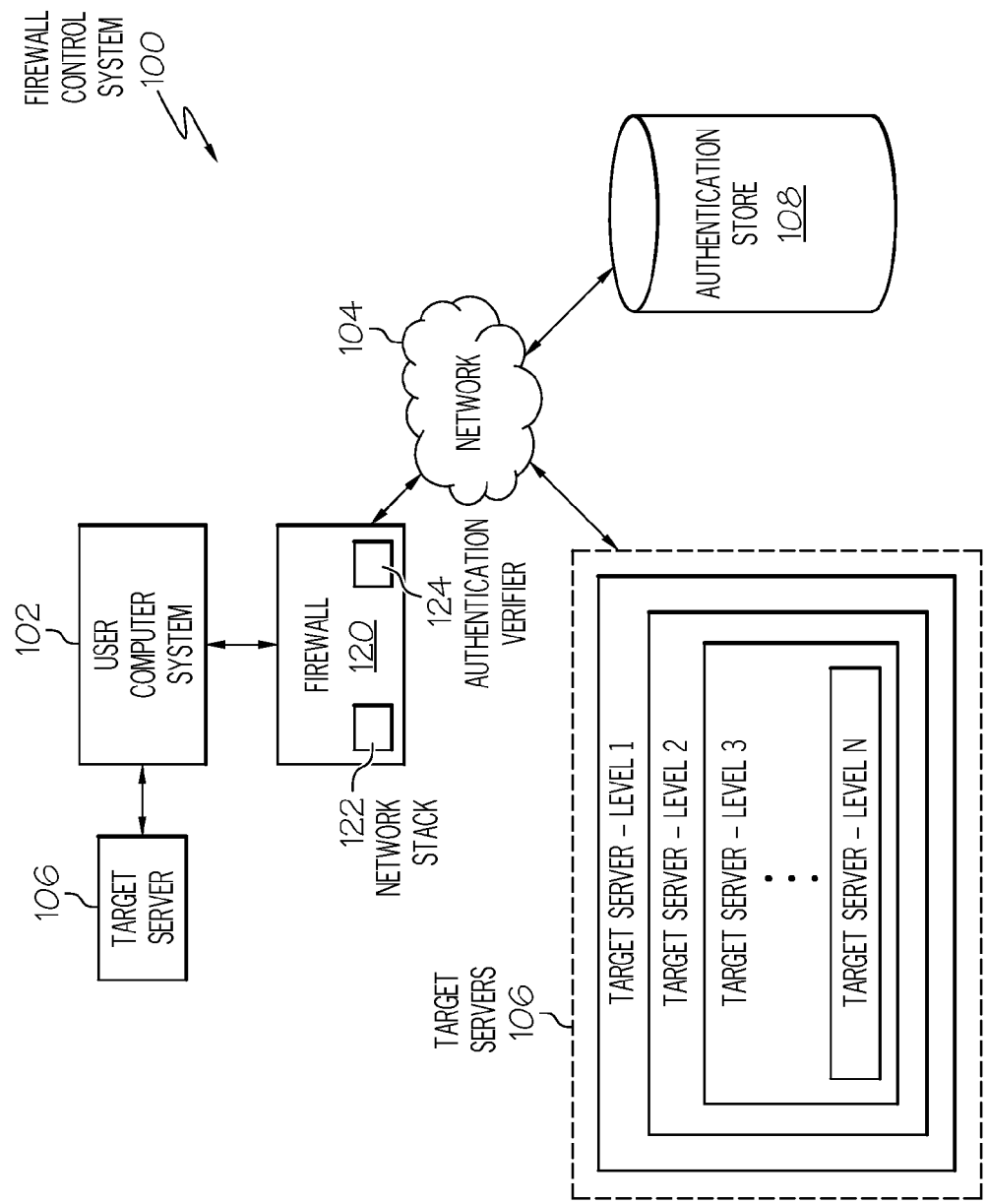
FIG. 1 depicts an environment for a firewall control system with a user computer system, firewall, a plurality of target servers, and an authentication store according to some embodiments.

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The descriptions below are designed to make such embodiments obvious to a person of ordinary skill in the art.

Generally speaking, systems, methods and media for implementing a firewall control system responsive to user authentications are disclosed. Embodiments of a method may include receiving a data request at a firewall where the data request is associated with a program of the user computer system. Embodiments of the method may also include determining whether an authentication plan is required to be matched for the associated program and, if so, accessing a stored authentication plan associated with the program and having one or more authentication records each having expected information relating to user access to a particular server. Embodiments of the method may also include accessing a current authentication plan from an authentication store, the current authentication plan having one or more authentication records each having information relating to user access to a particular server. Embodiments of the method may also include comparing the stored authentication plan with the received current authentication plan to determine whether they match and, in response, performing one or more firewall actions.

The system and methodology of the disclosed embodiments allows for effective and efficient control of a firewall by taking advantage of authentications made by a user to various servers (considered in a broad sense to be any entity for which authentication is required). Firewalls according to the disclosed embodiments are given the ability to check for layers of authentication performed by a user to target servers and to perform firewall actions such as modifying access (by allowing or denying access), redirecting data packets, or beginning monitoring in response. Firewalls may thus be controlled with increased sophistication, particularly with respect to controlling firewall usage related to individual programs. Data flow to and from a particular program may thus be controlled based on what target servers a user has successfully authenticated to at the time. A firewall may block or deny data from a particular peer to peer (P2P) client if the user has already authenticated to a corporate virtual private network (VPN), for example, as corporate standards may prohibit material commonly shared on P2P networks. The disclosed system may be useful for all types of software firewalls, including personal and non-personal (network) firewalls.

In general, the routines executed to implement the embodiments of the invention may be part of a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

While specific embodiments will be described below with reference to particular configurations of hardware and/or software, those of skill in the art will realize that embodiments of the present invention may advantageously be implemented with other substantially equivalent hardware, software systems, manual operations, or any combination of any or all of these. The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. Moreover, embodiments of the invention may also be implemented via parallel processing using a parallel computing architecture, such as one using multiple discrete systems (e.g., plurality of computers, etc.) or an internal multiprocessing architecture (e.g., a single system with parallel processing capabilities).

Aspects of the invention described herein may be stored or distributed on computer-readable medium as well as distributed electronically over the Internet or over other networks, including wireless networks. Data structures and transmission of data (including wireless transmission) particular to aspects of the invention are also encompassed within the scope of the invention. Furthermore, the invention can take the form of a computer program product accessible from a computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium may be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Each software program described herein may be operated on any type of data processing system, such as a personal computer, server, etc. A data processing system suitable for storing and/or executing program code may include at least one processor coupled directly or indirectly to memory elements through a system bus. The memory elements may include local memory employed during execution of the program code, bulk storage, and cache memories which provide temporary storage of at least some program code in order to reduce the number of times code must be retrieved from bulk storage during execution. Input/output (I/O) devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices though intervening private or public networks, including wireless networks. Modems, cable modems and Ethernet cards are just a few of the currently available types of network adapters.

Turning now to the drawings, FIG. 1 depicts an environment for a firewall control system with a user computer system, firewall, a plurality of target servers, and an authentication store according to some embodiments. In the depicted embodiment, the firewall control system 100 includes a user computer system 102 in communication with a network 104 through firewall 120. The user computer system 102 may be in communication with one or more target servers 106 which, as will be described subsequently, are servers in the software sense rather than in the machine classification sense and thus may be considered a software entity (e.g., application, operating system, network interface, etc.) for which authentication may be required for access. The user computer system 102 may authenticate to target servers 106 either directly or through firewall 120. The user computer system 102 and/or firewall 120 may also be in communication with an authentication store 108 via network 104.

A user of the user computer system 102 may authenticate to target servers 106 during the course of their normal usage. Often, the user will authenticate to cascading layers of target servers 106 such that access to one requires earlier access to another target server 106, such as a database target server 106 protected by a firewall target server 106 and an operating system authentication protocol. As will be described in more detail subsequently, the disclosed system may advantageously utilize information about these various authentications to different target servers 106 to control operation of the firewall 120. The firewall 120 may compare an expected set of authentications with a current set of authentications and may then perform firewall actions based on the determination. If a user has authenticated to, for example, a corporate VPN, various operations inconsistent with corporate policy may then be prohibited by the firewall 120. Similarly, a user authenticated to an administrator target server 106 may be given greater access by the firewall 120. The disclosed firewall 120 may thus provide an efficient and effective control mechanism based on authentications of a user and user computer system 102.

Users may utilize a user computer system 102 according to the present embodiments to access network 104 via firewall 120 for transmitting and receiving information. User computer system 102 may be a personal computer system or other computer system adapted to execute computer programs, such as a personal computer, workstation, server, notebook or laptop computer, desktop computer, personal digital assistant (PDA), mobile phone, wireless device, or set-top box, such as described in relation to FIG. 2. A user may, for example, interact with the user computer system 102 via a user interface to enter authentication information to a target server 106 or to receive information about firewall 120 access.

Network 104 may be any type of data communications channel or combination of channels, such as the Internet, an intranet, a LAN, a WAN, an Ethernet network, a wireless network, telephone network, a proprietary network, or a broadband cable network. In one example, the Internet may serve as network 104 and the firewall 120 may protect the user computer system 102 from Internet-based threats. In other examples, a user computer system may communicate with a target server 106 via a network 104 such as a corporate LAN that does not require the use of a firewall 120. Those skilled in the art will recognize, however, that the invention described herein may be implemented utilizing any type or combination of data communications channel(s) without departure from the scope and spirit of the invention.

As described previously, target servers 106 are software entities for which authentication may be required, and granted, in order to access resources of each target server 106. Target servers 106 may include a wide variety of software entities, including operating systems, databases, firewalls, virtual private networks (VPNs), networks, applications, or other entities. One or more target servers 106 may be implemented on server computer systems such as an International Business Machine Corporation (IBM) IBM Websphere® application server as well as any other type of computer system (such as described in relation to FIG. 2). As depicted in FIG. 1, the target servers 106 may be nested in layers so that access to an inner target server 106 first requires access to outer (in FIG. 1), lower level target servers 106. In the depicted embodiment, for example, access to the target server 106 at level 3 would also require access to the target servers 106 at levels 1 and 2. Target servers 106 may be either local or remote to a particular user computer system 102.

Authentication store 108 may include any type or combination of storage devices, including volatile or non-volatile storage such as hard drives, storage area networks, memory, fixed or removable storage, or other storage devices. The authentication store 108 in some embodiments may be an encrypted database of disparate local and remote authentication information that can be written to and read by a trusted source on behalf of any authorized authentication mechanism that requests it. The authentication store 108 may be located in a variety of positions with the firewall control system 100, such as being a stand-alone component (perhaps implemented by a trusted third party on a remote server or network of servers) or part of the user computer system 102 or firewall 120.

Firewall 120 may be a software firewall implemented on a computer system such as user computer system 102 (for a personal firewall) or a server computer system (such as for a corporate firewall). Example firewalls include those from Symantec Corp., Check Point® Software Technologies Ltd., Microsoft Corp., McAfee Inc., and Lavasoft. Non-personal firewall vendors include companies such as Cisco Systems Inc., NetGear, Inc., Linksys® (a division of Cisco Systems, Inc.), and TRENDnet. As described previously, firewall 120 may control the flow of data packets between a user computer system 102 and the network 104. Firewall 120 may include a network stack 122 and an authentication verifier 124. The network stack 122 is a component of the firewall software that interrogates incoming and outgoing data packets and applies various firewall rules against them to either allow or deny the packet access to and from the host. Firewall rules include allowing or denying packet access based on the network subnet the user is currently connected to, the day or time, whether requested data is inbound or outbound, whether the requested data is of a certain protocol (TCP, UDP, TCP and UDP, and ICMP), the port number to receive or send data through, the IP address or network the requested data is being sent to or received from, and the user's network adapter being used.

Figure 3:
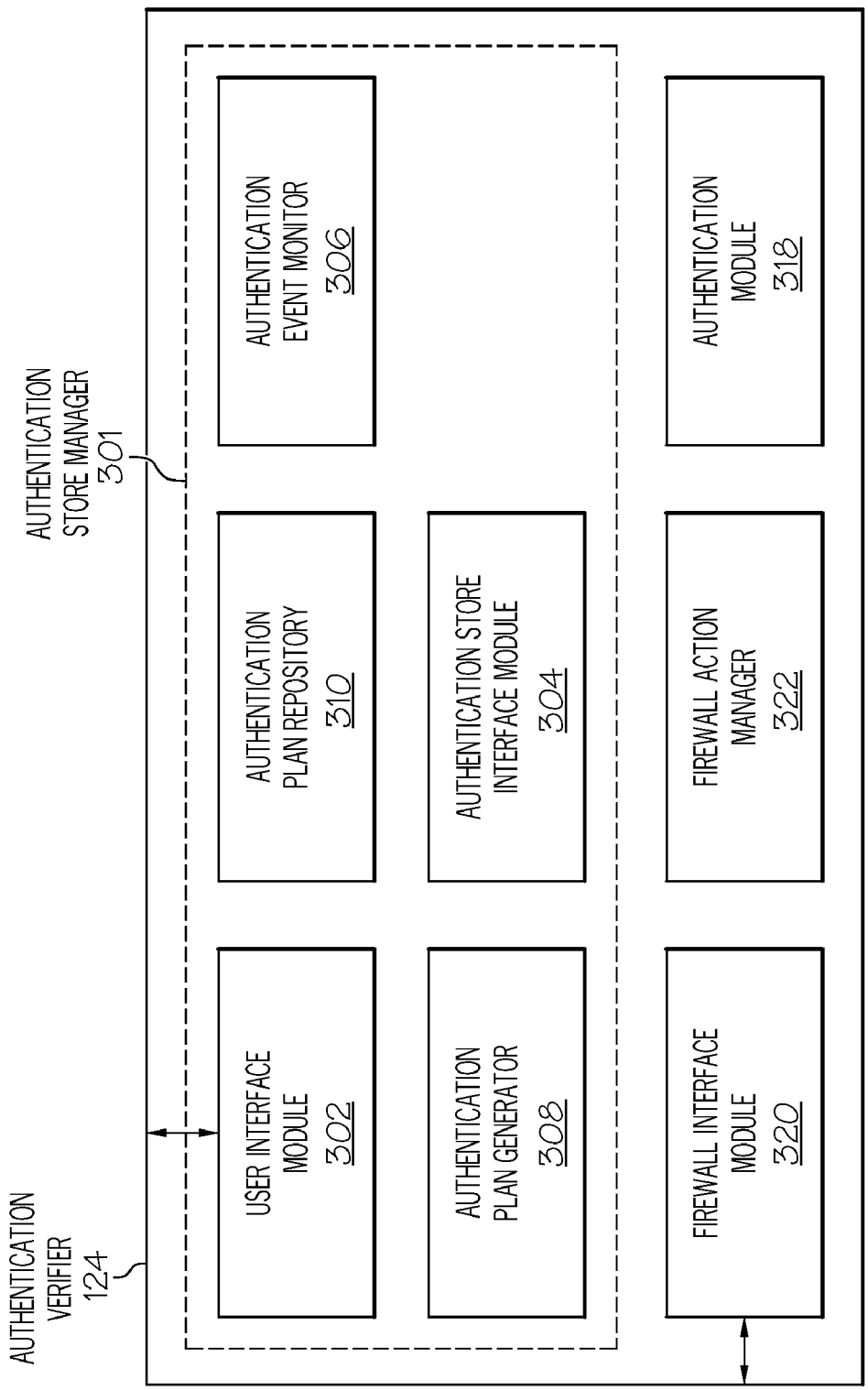
FIG. 3 depicts a conceptual illustration of software components of an authentication verifier according to some embodiments.

The authentication verifier 124, as described in more detail in relation to FIG. 3, may communicate with the network stack 122 and may provide further control of access to data packets according to the disclosed embodiments. Data packets may each have an associated program that is transmitting or receiving the data packet. The authentication verifier 124 may determine for a particular data packet whether a stored authentication plan exists for its associated program, where the stored authentication plan would have expected information relating to access by the user to particular target servers 106. The authentication verifier 124 may then access this plan and compare it to a current authentication plan for the program received from an authentication store 108. The authentication verifier 124 may then perform various firewall actions in response to the comparison, such as by allowing or denying data access, redirecting data to another device, or monitoring data packets. If the expected and current plans do not match, for example, the authentication verifier 124 may severely limit communication flow. If the expected and current plans do match and particular conditions exist, the authentication verifier 124 may control the firewall 120 in other, more specific ways, such as by limiting use of a program if certain authentications have occurred. Redirection of data (also known as port forwarding when data packets are forwarded to and from a specific port number) may also be used for authentication plans. If, for example, an application is trying to send data to an intranet server and the user has not authenticated to a corporate VPN or to a domain controller on the intranet, the authentication verifier may send the packets to an Internet server instead.

Various non-limiting examples may serve to further illustrate the disclosed firewall control system 100. In one example, the authentication verifier 124 may block data or otherwise deny access to and from a peer to peer (P2P) client if the user has authenticated to a VPN (which implies that the user is logged into a corporate network). This may prove useful where corporate standards discourage data typically found on P2P networks and also when organizations desire to prevent confidential or other proprietary information from being misappropriated over the P2P network. Another example that may prove useful in a corporate environment would be for the authentication verifier 124 preventing a corporate e-mail client program from being able to send data while the user is not authenticated to the corporate VPN or is not authenticated with a corporate Lightweight Directory Access Protocol (LDAP) directory or Microsoft Active Directory domain. An example of a cascading authentication-based control would be to prevent data requests to and from a user computer system 102 until the user has first authenticated with a VPN, followed by a corporate LDAP directory, and then followed by a boundary firewall. Yet another example would include preventing data requests to and from a high-bandwidth program (e.g., a P2P client, Microsoft NetMeeting, or a remote control program) if the user has authenticated to a VPN (signifying the user is on a lower-bandwidth connection).

Figure 2:
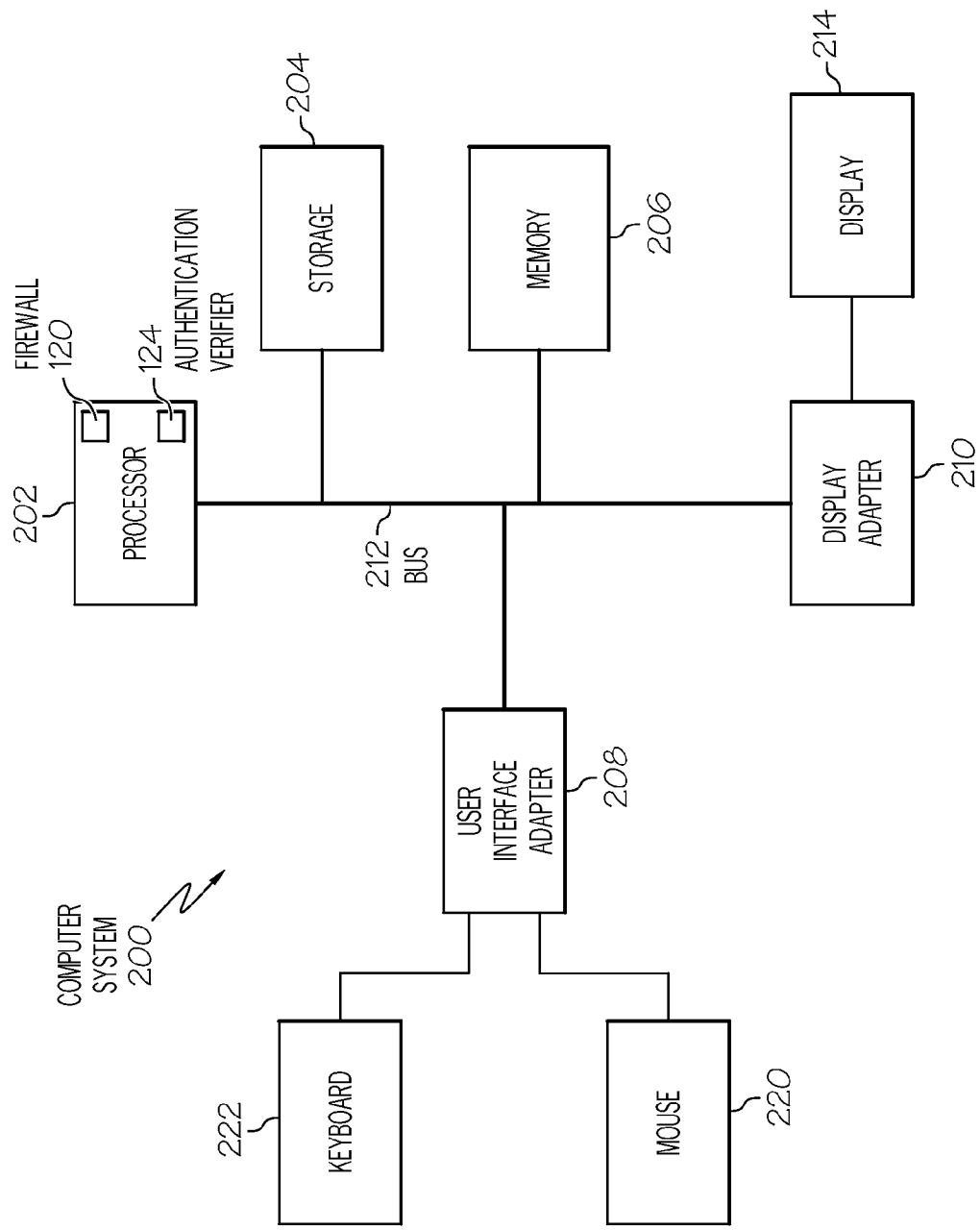
FIG. 2 depicts a block diagram of one embodiment of a computer system suitable for use as a component of the firewall control system.

FIG. 2 depicts a block diagram of one embodiment of a computer system 200 suitable for use as a component of the firewall control system 100, such as a user computer system 102. Other possibilities for the computer system 200 are possible, including a computer having capabilities other than those ascribed herein and possibly beyond those capabilities, and they may, in other embodiments, be any combination of processing devices such as workstations, servers, mainframe computers, notebook or laptop computers, desktop computers, PDAs, mobile phones, wireless devices, set-top boxes, or the like. At least certain of the components of computer system 200 may be mounted on a multi-layer planar or motherboard (which may itself be mounted on the chassis) to provide a means for electrically interconnecting the components of the computer system 200. Computer system 200 may be utilized to implement one or more target servers 106, a user computer system 102, firewall 120 and/or an authentication store 108.

In the depicted embodiment, the computer system 200 includes a processor 202, storage 204, memory 206, a user interface adapter 208, and a display adapter 210 connected to a bus 212 or other interconnect. The bus 212 facilitates communication between the processor 202 and other components of the computer system 200, as well as communication between components. Processor 202 may include one or more system central processing units (CPUs) or processors to execute instructions, such as an IBM® PowerPC™ processor, an Intel Pentium® processor, an Advanced Micro Devices Inc. processor or any other suitable processor. The processor 202 may utilize storage 204, which may be non-volatile storage such as one or more hard drives, tape drives, diskette drives, CD-ROM drive, DVD-ROM drive, or the like. The processor 202 may also be connected to memory 206 via bus 212, such as via a memory controller hub (MCH). System memory 206 may include volatile memory such as random access memory (RAM) or double data rate (DDR) synchronous dynamic random access memory (SDRAM). In the disclosed systems, for example, a processor 202 may execute instructions to perform functions of the firewall 120 (including the authentication verifier 124), such as by interacting with an authentication store 108 or comparing expected and current authentication plans, and may temporarily or permanently store information during its calculations or results after calculations in storage 204 or memory 206. All or part of the authentication verifier 124, for example, may be stored in memory 206 during execution of its routines.

The user interface adapter 208 may connect the processor 202 with user interface devices such as a mouse 220 or keyboard 222. The user interface adapter 208 may also connect with other types of user input devices, such as touch pads, touch sensitive screens, electronic pens, microphones, etc. A user of a user computer system 102 requesting access to network data or resolving an authentication plan conflict, for example, may utilize the keyboard 222 and mouse 220 to interact with the computer systems. The bus 212 may also connect the processor 202 to a display, such as an LCD display or CRT monitor, via the display adapter 210.

FIG. 3 depicts a conceptual illustration of software components of an authentication verifier 124 according to some embodiments. The authentication verifier 124 may be implemented on a computer system 200 such as described in relation to FIG. 2, including on a user computer system 102 (as part of a personal firewall) or on a server (as part of a network or other non-personal firewall). As described previously, the authentication verifier 124 may communicate with the network stack 122 and may provide further control of access to data packets. The authentication verifier 124 may include components to assist it with its functions, including an authentication store manager 301 having a user interface module 302, an authentication store interface module 304, an authentication event monitor 306, an authentication plan generator 308, and an authentication plan repository 310. The authentication verifier 124 may also include an authentication module 318, a firewall interface module 320, and a firewall action manager 322. One of ordinary skill in the art will recognize that the functionality of each component of the authentication verifier 124 may be combined or divided in any fashion and the description herein is merely intended to be illustrative of some embodiments.

The authentication store manager 301 may manage the authentication store 108 as well as authentication information relating to a user's authentication to different target servers 106. The user interface module 302 may facilitate communication to and from a user, including receiving requests for access to a target server 106 and transmitting an indication that access was granted or denied, that an authentication plan for a target server 106 needs to be created or modified, or other information. The authentication store interface module 304 may facilitate communication to and from the authentication store 108, including storing an indication of authentication events in the authentication store 108 and accessing authentication plans upon request of the authentication module 318.

The authentication event monitor 306 may monitor a user's performed authentication steps (e.g., entering a password, using a smart card, etc.) and may store an encrypted indication of such steps in the authentication store 108 (via the authentication store interface module 304). In some embodiments, the authentication event monitor 306 may at every authentication step create an encrypted event record for storage in the authentication store 108 with information that the authentication module 318 may ultimately request. The information in the authentication record may include one or more of a unique record identifier for internal management use, one or more target server 106 identifiers (such as MAC address, server type, server identifier, server group, IP address, etc.), one or more user identifiers (such as a user name, group name, etc.), one or more authentication event facts (such as the number of failed authentication attempts prior to successful login, timestamp local to the authentication store 108, etc.) or other information.

The authentication plan generator 308 may facilitate creation and maintenance of an authentication plan for a user and a particular program. A user may create a plan if required or allowed by either the program or the authentication module 318, as described in more detail n relation to FIG. 4. In some embodiments, an administrator of the firewall 120 may have pre-established the required authentication steps required in any authentication plan for a program. A firewall administrator could require, for example, that the authentication plan include at least server types BIOS, OS, VPN, and FIRE-WALL, and perhaps further pre-known information such as a specific VPN server group or firewall IP address. The authentication plan generator 308 may store the generated authentication plan for a program in the authentication plan repository 310.

The other components of the authentication verifier 124 may utilize the authentication plans managed by the authentication store manager 301. The authentication module 318 may determine for a particular data packet whether a stored authentication plan exists for its associated program, where the stored authentication plan would have expected information relating to access by the user to particular target servers 106. The authentication module 318 may then access this plan from the authentication store manager 301 and compare it to a current authentication plan for the program received from an authentication store 108.

After the comparison has been made, the firewall action manager 322 may then perform various firewall actions in response to the comparison, such as by allowing or denying data access, redirecting data to another device, or monitoring data packets. If the expected and current plans do not match, for example, the authentication verifier 124 may severely limit communication flow. If the expected and current plans do match and particular conditions exist, the authentication verifier 124 may control the firewall 120 in other, more specific ways, such as by limiting use of a program if certain authentications have occurred. The firewall interface module 320 may serve as the interface between the authentication verifier 124 and the other components of the firewall 120, such as the network stack 122.

Figure 4:
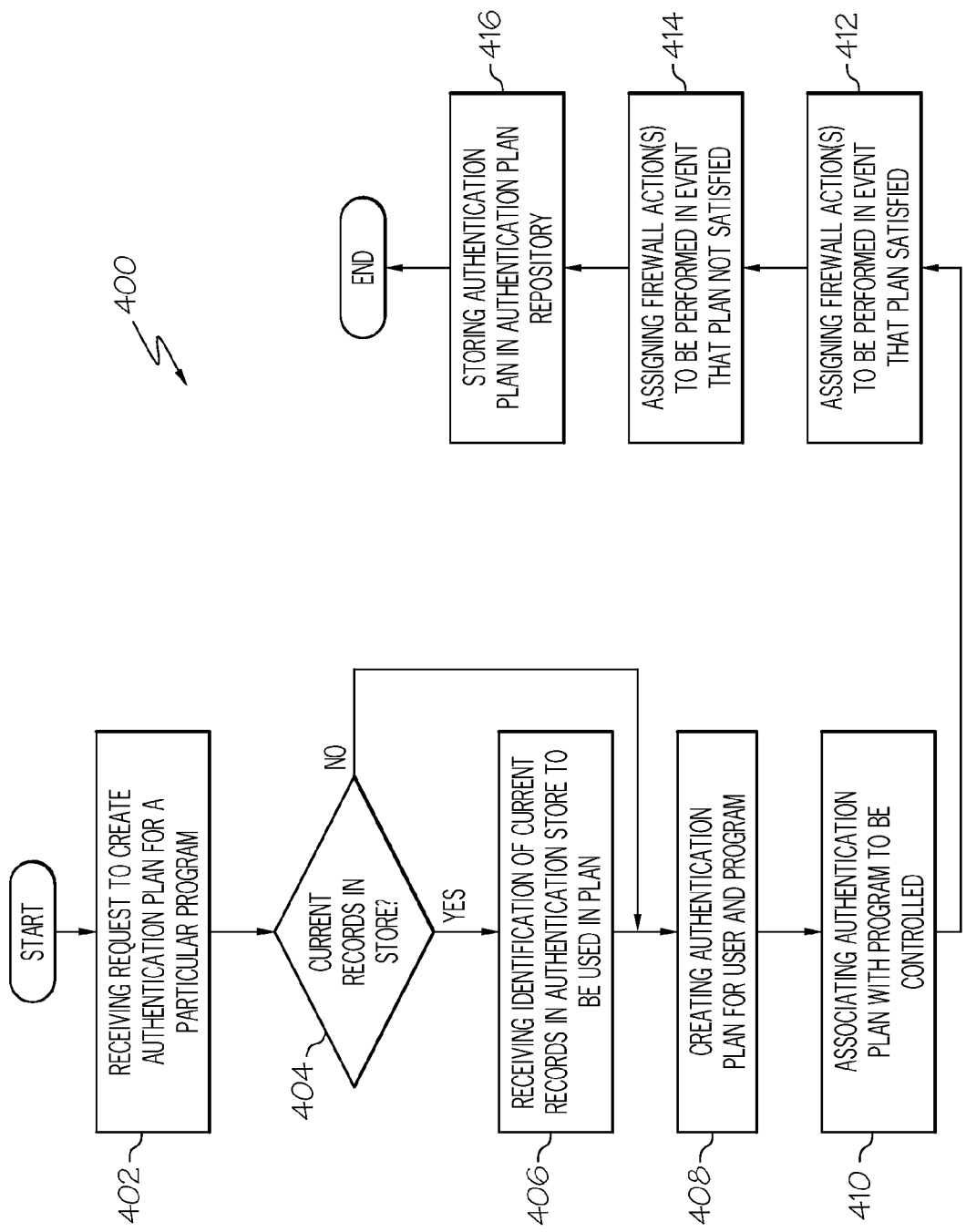
FIG. 4 depicts an example of a flow chart for creating an authentication plan for a particular program according to some embodiments.

FIG. 4 depicts an example of a flow chart 400 for creating an authentication plan for a particular program according to some embodiments. The method of flow chart 400 may be performed, in one embodiment, by components of the authentication store manager 301. Flow chart 400 begins with element 402, receiving a request to create an authentication plan for a particular program (and optionally for a particular user) to be controlled by the firewall 120. The request for an authentication plan may be received from an administrator of the firewall 120, the authentication verifier 124, or a user requesting to establish an authentication plan for a particular program. In one embodiment, a firewall administrator may request the creation of authentication plans for a particular program (such as an e-mail client or browser) for all (or a plurality) of the users of an organization.

At decision block 404, the authentication store manager 301 may determine whether any authentication records currently exist for the particular user for authentications to particular target servers 106. If so, the authentication store manager 301 may present the current list of existing authentication records (from the authentication store 108) to the user so that the user may select which authentication events they would like to include in the authentication plan for the program. The authentication store manager 301 may receive an identification of the current records in the authentication store 108 that will be used in the authentication plan at element 406. The authentication module 318 may also require particular authentication events from the user in addition to those chosen by the user. At element 408, the authentication plan generator 308 of the authentication store manager 301 may create the authentication plan based on the preferences and selections of the user and the authentication module 318. In some embodiments, the preferences of the user are not utilized and an administrator makes the decisions as to which authentication events are required, eliminating the need for decision block 404.

After the authentication plan has been created at element 408, the authentication store manager 301 may at element 410 associate the created authentication plan with the program to be controlled. The particular user for multi-user computer systems may also be specified in addition to the program according to some embodiments. The particular authentication events that should be checked for each program to be monitored may thus be specified, providing significant flexibility in firewall control. Control may also be specified as to inbound, outbound, or all traffic, and may be in addition to and in conjunction with firewall rules used by the network stack 122. For example, inbound data access to a program may be allowed if the authentication event sequence is correct (as part of authentication plan), the traffic is at a specific port using a specific protocol (rule from network stack 122), and the source address is from a trusted network (rule from network stack 122).

Firewall actions may be optionally specified to be performed in the event that the authentication plan is satisfied at element 412 and in the event that the authentication plan is not satisfied at element 414. As described previously, firewall actions may include allowing or denying data access (or otherwise modifying data access), redirecting data packets, monitoring, or any other action firewall software may perform. Firewall actions may be specified in either or both of elements 412 and 414. After the firewall actions have been assigned, the authentication plan may, at element 416, be stored in the authentication plan repository 310, after which the method terminates.

Figure 5:
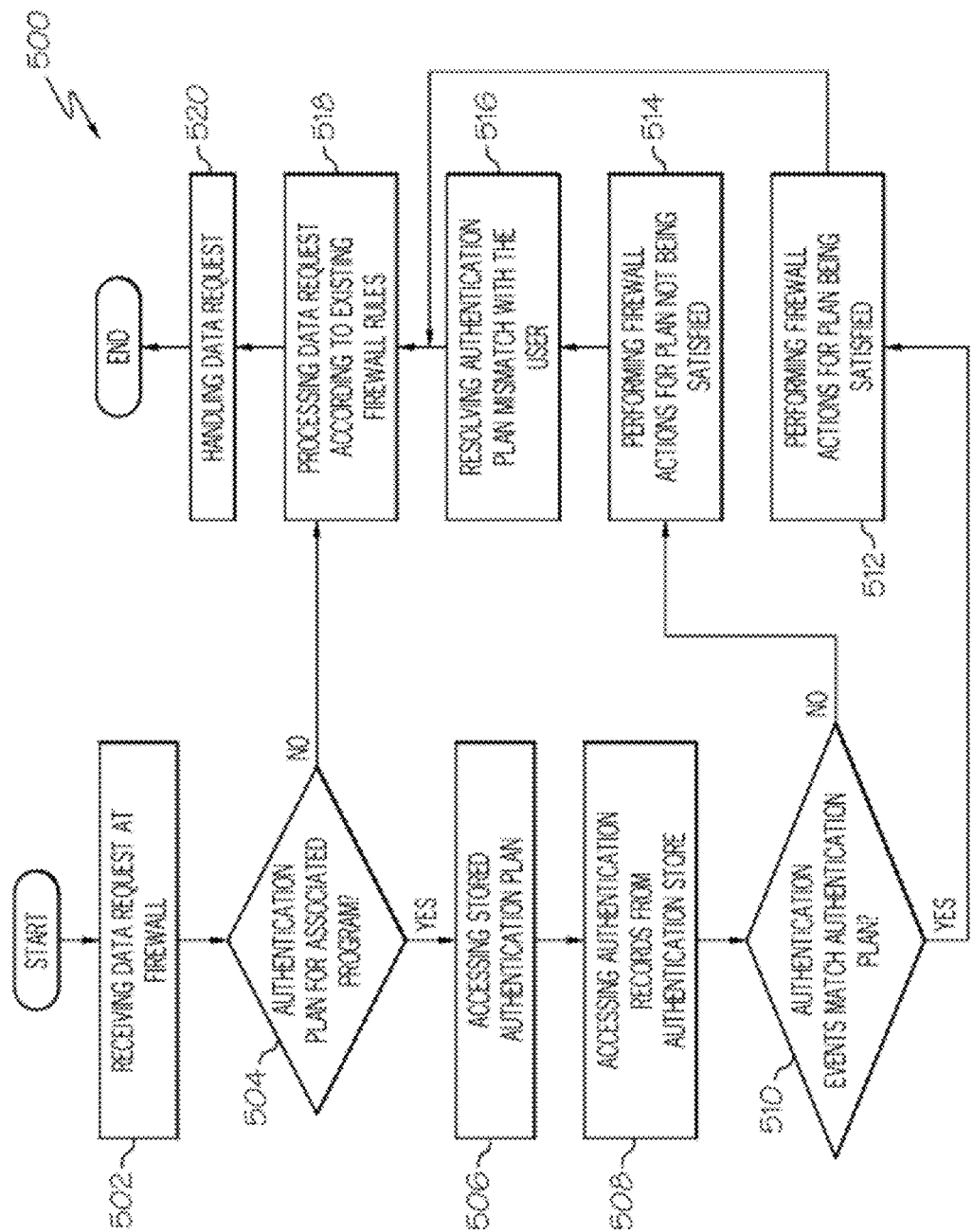
FIG. 5 depicts an example of a flow chart for controlling a firewall for particular programs based on authentication plans according to some embodiments.

FIG. 5 depicts an example of a flow chart 500 for controlling a firewall for particular programs based on authentication plans according to some embodiments. The method of flow chart 500 may be performed, in one embodiment, by components of the authentication verifier 124 such as an authentication module 318. Flow chart 500 begins with element 502, receiving a data request at a firewall 120. In one embodiment, element 502 may include the authentication verifier 124 receiving an indication of a received data packet at the network stack 122. The data request may include a data packet and an indication of a particular program that is transmitting or receiving the data packet and is thus associated with the data request.

At decision block 504, the authentication verifier 124 may determine whether the associated program (and also optionally associated user) has an authentication plan that requires matching. If not, the method continues to element 518 for processing the data request according to existing firewall rules by the network stack 122, after which the method terminates. If so, the authentication verifier 124 may at element 506 access the stored authentication plan for the program that is stored in the authentication plan repository 310. The stored authentication plan may have one or more authentication records each having expected information relating to user access to a particular target server 106 (i.e., server). The authentication verifier 124 may also at element 508 access the current authentication plan (and the authentication records within) for the user from the authentication store 108. The current authentication plan may have one or more authentication records each having current information relating to user access to a particular target server 106.

The authentication module 318 may at decision block 510 compare the stored authentication plan with the current authentication plan to determine whether they match and, if so, the extent of their match. In some embodiments, the authentication module 318 may require an exact match between the stored authentication plan and the current authentication plan in order for the firewall 120 to allow the associated program to operate freely. In other embodiments, the authentication module 318 may make a more sophisticated analysis, such as by analyzing the timestamps of authentication events in the current authentication plans (and rejecting those that are too long ago in time), analyzing the matter of authentication for previous authentication events (e.g., rejecting those that show a suspicious pattern, such as too many attempts before authentication), or other types of analysis.

If the authentication module 318 determines at decision block 510 that a match exists (at least for some elements), the method continues to element 512 where the firewall actions for the authentication plan being satisfied are performed, after which the method continues to element 518 for further processing. If the authentication module 318 determines at decision block 510 that no match exists (at least for some elements), the method continues to element 514 where the firewall actions for the authentication plan not being satisfied are performed. In this case, the method may continue to element 516 to resolve an authentication plan mismatch, after which the method continues to element 518 for further processing. To resolve an authentication plan mismatch, the authentication verifier 124 may attempt to resolve a discrepancy in an authentication plan with a user. For example, the user may be requested to provide additional authentication credentials, such as a passphrase, in order to be allowed to use a program for the purpose they desire.

At element 518, the network stack 122 may process the data request according to any existing firewall rules, as described previously, after which the method terminates. The existing firewall rules may thus exist in conjunction with the firewall actions of elements 512 and 514. Element 518 may optionally be performed before or simultaneously with the other elements of method 500 that utilize the authentication plans. At element 520 the data request may be allowed, denied, or partially allowed according to the firewall rules and the firewall actions determined previously. The method of flow chart 500 may thus provide for improved control of a firewall 120 by facilitating program-specific authentication plans that allow control of data flow on a program-by-program basis.

Figure 6:
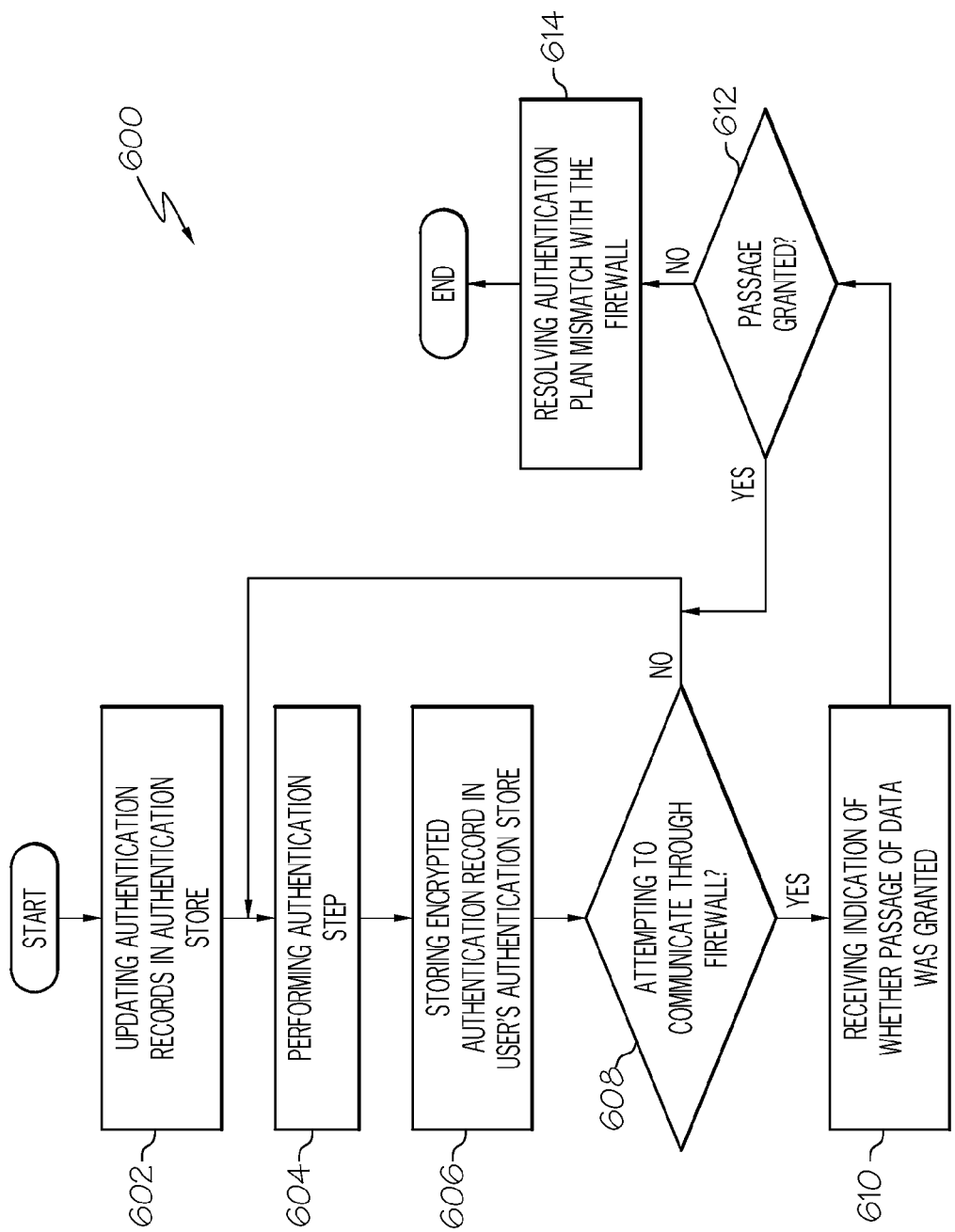
FIG. 6 depicts an example of a flow chart for attempting to communicate through a firewall according to some embodiments.

FIG. 6 depicts an example of a flow chart 600 for attempting to communicate through a firewall 120 according to some embodiments. Flow chart 600 begins with optional element 602, updating authentication records in the authentication store 108. The authentication store manager 301 may update the authentication records for a variety of reasons. In some embodiments, for example, the authentication store manager 301 may attempt to avoid stale information by deleting the authentication record whenever a target server 106 that has been authenticated is logged out or disconnected or whenever a target server 106 earlier in the authentication plan is similarly logged out or disconnected. In these embodiments, the authentication record may first be written to another table for archival purposes such as reporting or usage analysis.

The user on the user computer system 102 may perform authentication steps for different target servers 106 at element 604, such as by successfully authenticating to a target server 106 such as the machine hardware (with a power on password), their operating system, a VPN, a firewall, a database, etc. At element 606, the authentication store manager 301 may store an encrypted authentication record in the authentication store 108, as described previously. The authentication record may include information about performance of the authentication step, such as indication of its success, a timestamp, an indication of how many attempts were required, etc. The user computer system 102 may then attempt to communicate through the firewall decision block 608 by a program of the user computer system 102 attempting to transmit or receive data through the firewall 120. If no attempt to communicate through the firewall 120 is being made, the method may return to element 604 for performing the authentication step and storing an authentication record based on the performed step.

If an attempt was made to communicate through the firewall 120, the user computer system 102 may at element 610 receive an indication of whether passage of data through the firewall 120 was allowed. In some embodiments, indications will only be received when passage was not allowed so that users are not bothered by continued messages that they are allowed to communicate through the firewall 120. If passage was allowed, the method returns to element 604 for further processing. If passage was not allowed at decision block 612, the user may attempt to resolve any authentication plan mismatch with the firewall 120 and its authentication verifier 124, as described previously, after which the method terminates.

It will be apparent to those skilled in the art having the benefit of this disclosure that the present invention contemplates methods, systems, and media for implementing a firewall control system responsive to user authentications. It is understood that the form of the invention shown and described in the detailed description and the drawings are to be taken merely as examples. It is intended that the following claims be interpreted broadly to embrace all the variations of the example embodiments disclosed.

What is claimed is:

1. A method for controlling a firewall for a user computing system, said method comprising:
   receiving, by a processor of a computer system, a data request at the firewall, wherein the data request comprises a data packet and an indication of a program that is associated with the data request;
   said processor determining whether an authentication plan requires a match for the program;
   in response to determining that the authentication plan requires the match for the program, said processor accessing a stored authentication plan associated with the program, the stored authentication plan having one or more authentication records each having expected information relating to user access to a particular server, the stored authentication plan being stored in a repository of the firewall, the stored authentication plan having been generated based at least on selections of an authentication verifier in the firewall;
   said processor accessing a current authentication plan from a storage device, the current authentication plan having one or more authentication records each having current information relating to user access to a particular server;
   said processor comparing the stored authentication plan with the current authentication plan to determine, based on analyzing authentication events, whether there is at least a partial match between the stored authentication plan and the current authentication plan; and
   in response to the comparing between the stored authentication plan and the current authentication plan, said processor performing one or more firewall actions selected from the group consisting of allowing access to data packets, denying access to data packets, monitoring data packets, and redirecting data packets to another device.

2. The method of claim 1, said method comprising:
   said processor determining, from said comparing, that there is a mismatch between the stored authentication plan and the current authentication plan; and
   in response to said determining that there is the mismatch and before said performing one or more firewall actions, said processor resolving the mismatch.

3. The method of claim 1, wherein said receiving the data request at the firewall comprises receiving the data request from the program.

4. The method of claim 1, wherein said receiving the data request at the firewall comprises said program receiving the data request.

5. The method of claim 1, said method further comprising:
   said processor receiving a request to generate an authenticating plan for the program;
   said processor generating the authenticating plan for the program based on selections made by an authentication verifier in the firewall;
   said processor associating the authenticating plan with the program;
   said processor specifying firewall action to be performed if the authenticating plan is satisfied;
   said processor specifying firewall action to be performed if the authenticating plan is not satisfied; and
   said processor storing the authenticating plan in the repository in the firewall.

6. The method of claim 5, wherein said receiving the request to generate the authenticating plan comprises receiving, from the authentication verifier in the firewall, the request to generate the authenticating plan.

7. The method of claim 1, wherein the one or more authentication records of the current authentication plan comprise a number of failed authentication attempts prior to a successful login.

8. A computer program product, comprising a computer physically tangible storage device having a computer readable program code stored therein, said program code configured to be executed by a processor of a computer system to implement a method for controlling a firewall for a user computing system, said method comprising:
   said processor receiving a data request at the firewall, wherein the data request comprises a data packet and an indication of a program that is associated with the data request;
   said processor determining whether an authentication plan requires a match for the program;
   in response to determining that the authentication plan requires the match for the program, said processor accessing a stored authentication plan associated with the program, the stored authentication plan having one or more authentication records each having expected information relating to user access to a particular server, the stored authentication plan being stored in a repository of the firewall, the stored authentication plan having been generated based at least on selections of an authentication verifier in the firewall;
   said processor accessing a current authentication plan from a storage device, the current authentication plan having one or more authentication records each having current information relating to user access to a particular server;
   said processor comparing the stored authentication plan with the current authentication plan to determine, based on analyzing authentication events, whether there is at least a partial match between the stored authentication plan and the current authentication plan; and
   in response to the comparing between the stored authentication plan and the current authentication plan, said processor performing one or more firewall actions selected from the group consisting of allowing access to data packets, denying access to data packets, monitoring data packets, and redirecting data packets to another device.

9. The computer program product of claim 8, said method comprising:
said processor determining, from said comparing, that there is a mismatch between the stored authentication plan and the current authentication plan; and
in response to said determining that there is the mismatch and before said performing one or more firewall actions, said processor resolving the mismatch.

10. The computer program product of claim 8, wherein said receiving the data request at the firewall comprises receiving the data request from the program.

11. The computer program product of claim 8, wherein said receiving the data request at the firewall comprises said program receiving the data request.

12. The computer program product of claim 8, said method further comprising:
said processor receiving a request to generate an authenticating plan for the program;
said processor generating the authenticating plan for the program based on selections made by an authentication verifier in the firewall;
said processor associating the authenticating plan with the program;
said processor specifying firewall action to be performed if the authenticating plan is satisfied;
said processor specifying firewall action to be performed if the authenticating plan is not satisfied; and
said processor storing the authenticating plan in the repository in the firewall.

13. The computer program product of claim 12, wherein said receiving the request to generate the authenticating plan comprises receiving, from the authentication verifier in the firewall, the request to generate the authenticating plan.

14. The computer program product of claim 8, wherein the one or more authentication records of the current authentication plan comprise a number of failed authentication attempts prior to a successful login.

15. A computer system comprising a processor, a memory coupled to the processor, and a computer readable storage device coupled to the processor, said storage device containing program code configured to be executed by the processor via the memory to implement a method for controlling a firewall for a user computing system, said method comprising:
said processor receiving a data request at the firewall, wherein the data request comprises a data packet and an indication of a program that is associated with the data request;
said processor determining whether an authentication plan requires a match for the program;
in response to determining that the authentication plan requires the match for the program, said processor accessing a stored authentication plan associated with the program, the stored authentication plan having one or more authentication records each having expected information relating to user access to a particular server, the stored authentication plan being stored in a repository of the firewall, the stored authentication plan having been generated based at least on selections of an authentication verifier in the firewall;
said processor accessing a current authentication plan from a storage device, the current authentication plan having one or more authentication records each having current information relating to user access to a particular server;
said processor comparing the stored authentication plan with the current authentication plan to determine, based on analyzing authentication events, whether there is at least a partial match between the stored authentication plan and the current authentication plan; and
in response to the comparing between the stored authentication plan and the current authentication plan, said processor performing one or more firewall actions selected from the group consisting of allowing access to data packets, denying access to data packets, monitoring data packets, and redirecting data packets to another device.

16. The computer system of claim 15, said method comprising:
said processor determining, from said comparing, that there is a mismatch between the stored authentication plan and the current authentication plan; and
in response to said determining that there is the mismatch and before said performing one or more firewall actions, said processor resolving the mismatch.

17. The computer system of claim 15, wherein said receiving the data request at the firewall comprises receiving the data request from the program.

18. The computer system of claim 15, wherein said receiving the data request at the firewall comprises said program receiving the data request.

19. The computer system of claim 15, said method further comprising:
said processor receiving a request to generate an authenticating plan for the program;
said processor generating the authenticating plan for the program based on selections made by an authentication verifier in the firewall;
said processor associating the authenticating plan with the program;
said processor specifying firewall action to be performed if the authenticating plan is satisfied;
said processor specifying firewall action to be performed if the authenticating plan is not satisfied; and
said processor storing the authenticating plan in the repository in the firewall.

20. The computer system of claim 19, wherein said receiving the request to generate the authenticating plan comprises receiving, from the authentication verifier in the firewall, the request to generate the authenticating plan.

* * * * *